Oct. 3, 1967    R. W. COTTER    3,345,565
CONTINUITY FIELD TEST BRIDGE CIRCUIT WITH
DIODE-CONTROLLED VISUAL INDICATOR MEANS
Filed Aug. 27, 1965    2 Sheets-Sheet 1
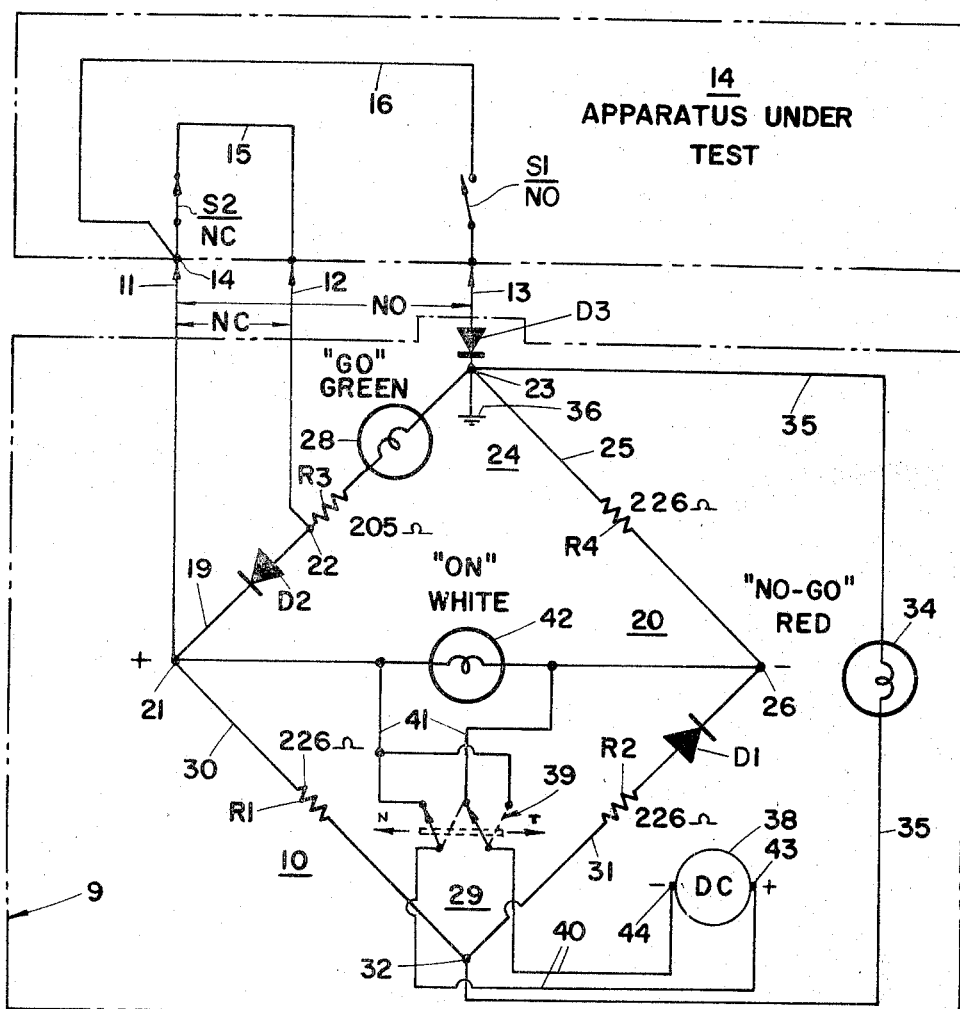
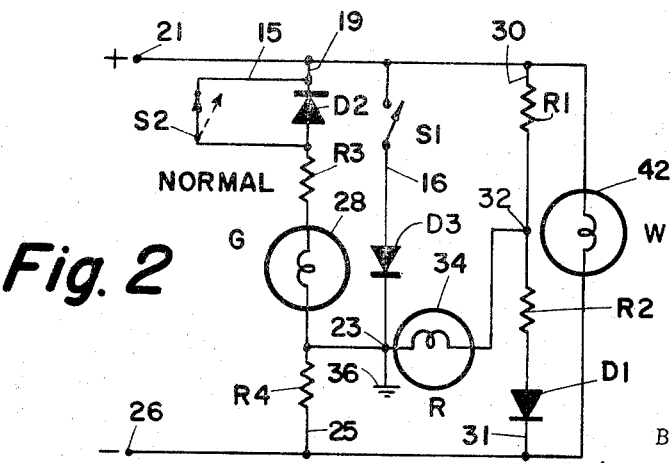
INVENTOR.
RICHARD W. COTTER
ATTORNEYS

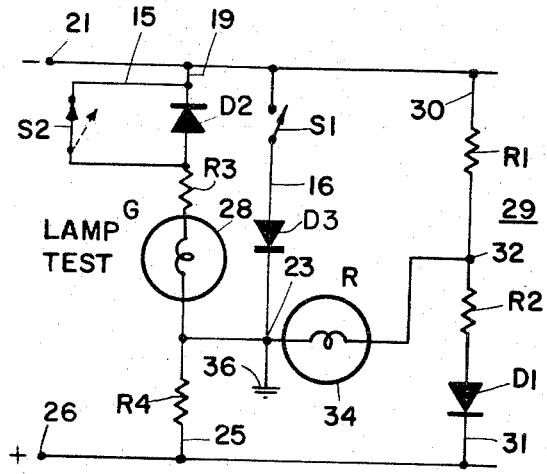
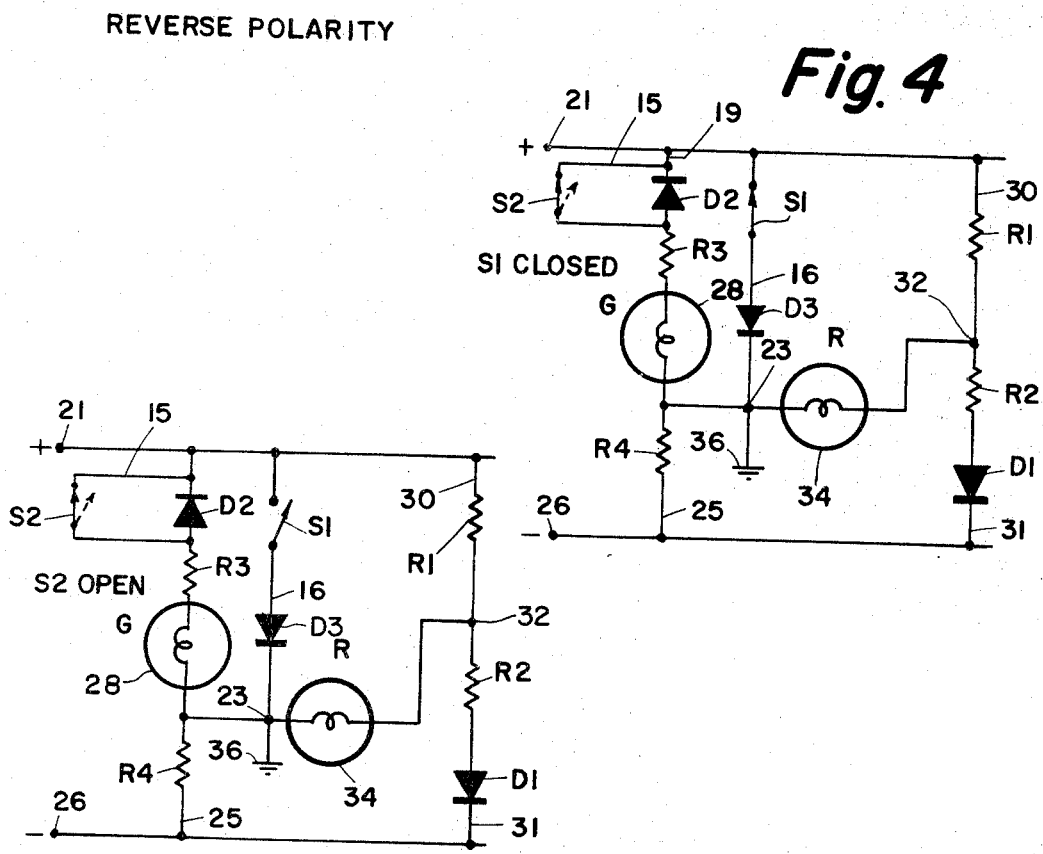

United States Patent Office 3,345,565
Patented Oct. 3, 1967

3,345,565
CONTINUITY FIELD TEST BRIDGE CIRCUIT WITH DIODE-CONTROLLED VISUAL INDICATOR MEANS
Richard W. Cotter, Minneapolis, Minn., assignor, by mesne assignments, to the United States of America as represented by the Secretary of the Army
Filed Aug. 27, 1965, Ser. No. 483,381
4 Claims. (Cl. 324—51)

ABSTRACT OF THE DISCLOSURE

A test bridge circuit for testing open and closed circuit conditions in electrical apparatus in connection with one arm of the bridge circuit. Three indicator lamps or like visual indicator devices and three diodes are connected in the bridge circuit network to permit testing the operativeness of the lamps or visual indicator devices, before checking an apparatus, by merely reversing the input voltage to the bridge circuit. At the same time the diodes function to direct indicating currents to the indicator devices in such a way that normal and abnormal open and closed circuit conditions in the apparatus are indicated by two of the devices without external or internal switching controls.

---

The present invention relates to electrical testing apparatus and more specifically to a continuity test circuit for rapidly checking electrical apparatus for normal and abnormal open and closed circuit conditions.

In all electrical apparatus there are normally-open and normally-closed circuits that require checking during manufacturing and inspection and later from time to time when in actual use. Testing apparatus for rapidly determining the normality of such circuits, that is, the open and closed circuit conditions thereof, is thus highly desirable and may provide visual indication, as by indicator lamps, which are either off or on in operation to indicate a "go-no-go" condition of operation, since no resistance or other circuit parameters are involved in this kind of check.

Like all test apparatus, the internal components, such as visual indicator devices, for example, which operate generally on an off-on basis, must be checked for defects which would give false indication or test results if undetected. For example, an indicator lamp failure would give an erroneous impression of circuit switch positions in an apparatus under check or test for closed and open circuit conditions. It is therefore an object of this invention, to provide, in a testing apparatus, an improved test circuit for rapidly determining open and closed circuit conditions in other electrical apparatus.

It is also an object of this invention, to provide an improved test circuit of the type referred to in which the indicator or lamp components may rapidly be checked periodically to eliminate the possibility of error in operation due to lamp burn-outs or other defects.

It is a further object of this invention to provide an improved continuity test circuit for electrical apparatus wherein a resistance bridge with direct-current supply may be provided in connection with a plurality of indicator lamps and improved and simplified diode-control means for reliably testing said apparatus for circuit continuity and said lamps for defective operation or burn-out.

Without such test circuit, a faulty lamp or other visual indicator of the limited current-carrying capacity and/or operating light would give the impression that the circuit being tested has failed. When such a test circuit is used to test circuit continuity in a missile system, for example, it is imperative that such erroneous indication not be given.

The improved test circuit of the present invention readily provides such periodic check and protection through the use of simple circuit changes in connection with the standard direct-current balanced low-voltage resistance bridge circuit and at least two, and preferably three, indicator lamps connected therewith. These lamps may be in different colors or provide different color indications.

In accordance with the invention, a balanced resistance bridge circuit is provided with energy from a direct current source. Under normal conditions the polarity of the bridge terminals is such that there is current flow through the entire bridge, that is, through both branches of the bridge from the positive to the negative terminals and all four arms. As is understood the output terminals of the bridge are connected with the opposite corners of the bridge circuit from the input positive and negative terminals, or to the arm junctions in each branch.

Test circuit connections are then made with one of the bridge circuits for open and closed circuit testing. If the circuit connections in the apparatus under test are checked and found to be properly open or closed, the bridge is balanced and no current flows through the negative or no-go indicator lamp. This is generally the red lamp in the present apparatus. The circuit indicator lamp, which may be green in the present apparatus, will receive current flow and will thus be lighted to indicate that the circuits are in the normal condition and that the switches therein are in normal position either open or closed, as the case may be.

If the polarity of the bridge input terminals is reversed, a diode in the bridge circuit is poled in a direction to prevent current flow through that portion of the bridge. This unbalances the bridge circuit to provide a potential across both of the indicator lamps. Both lamps are thus lighted to indicate that they are working properly. A third lamp may be connected directly across the bridge input terminals to indicate that the bridge is energized and ready for test operation as a further safety precaution in the operation of the test equipment.

If, in the test operation in connection with an apparatus to be tested, any normally-open circuits are found to be closed or any normally-closed circuits are found to be opened, current flow is cut off to the second or green lamp which will then be de-energized and the first or red lamp will be energized to indicate the defect. Thus it will be seen that a lamp failure could give an erroneous impression of the switch position or other circuit conditions in an apparatus being tested. This improved circuit permits the indicator devices or lamps to be checked periodically in order to eliminate the possibility of error, and the third indicator lamp provides indication of the readiness of the test equipment to operate. This feature is of prime importance for use in the testing of equipments which require positive operation in use and when failure would be liable to cause disaster in the operation of the equipment later.

The invention will further be understood from the following description when considered in connection with the accompanying drawing, and its scope is pointed out in the appended claims.

In the drawing,

FIG. 1 is a schematic circuit diagram of an improved test circuit for use in testing equipment and connected for testing an electrical apparatus having open and closed circuits, in accordance with the invention, FIG. 2 is a further schematic circuit diagram of a portion of the circuit of FIG. 1 and of the apparatus under test indicating normal operating conditions, FIG. 3 is a similar schematic circuit diagram as in FIG. 1 showing a reverse polarity on the test circuit and resulting lamp test indications in the test apparatus, and FIGS. 4 and 5 are similar schematic circuit diagrams as in FIG. 2 showing the test indications resulting from abnormal circuit conditions in the apparatus under test.

Referring to the drawing wherein like circuit elements and circuits are indicated by like reference numerals throughout the various figures, and referring particularly to FIG. 1, the test apparatus indicated in outline at 9 includes an improved field-test bridge circuit 10 having output test leads as indicated at 11, 12 and 13 connected with an apparatus 14 for test and which includes, for example, at least one normally-closed circuit 15 and at least one normally-open circuit 16. A normally-closed switch S2 is included in the first circuit 15 and a normally-open switch S1 is included in the second circuit 16 to represent the respective open and closed circuits within the test apparatus 14. A diode D3 in the normally open circuit 16 is poled in the forward direction to permit current flow through the switch S1 from the test lead 11 to the test lead 13. It may best be mounted in the bridge or test apparatus and inserted serially in the output connection for the lead 13 as shown.

The three test leads are all connected with one arm 19 of a resistance bridge circuit 20 at terminals indicated at 21, 22 and 23 respectively. The terminal 21 is the positive DC supply terminal or input terminal for the bridge circuit and the terminal 23 is the mid-terminal of the branch 24 of the bridge circuit, and of which the second arm is the resistance arm 25. This arm extends between the terminals 23 and a terminal 26. The latter terminal is the negative DC voltage supply or input terminal of the bridge circuit 20.

The branch circuit 24 of the bridge circuit thus includes the resistor arm 19 and the resistor arm 25 carrying the mid-terminal 23 therebetween which is one of the output terminals of the bridge. The resitsor R3 in the arm 19 and a resistor R4 in the arm 25 constitute the main elements thereof and have resistance values in the present example as indicated in the drawing. The resistance of the resistor R3 is supplemented by the filament of an indicator lamp 28 connected between it and the terminal 23 serially as indicated. Between the terminal 21 and the resistor R3 is connected a diode D2 poled in the direction of the terminal 21 to conduct current thereto, and will normally prevent current flow therefrom as indicated. Thus the arm 19 includes the diode D2 in parallel with circuit 15, the resistor R3 and the filament of the indicator lamp 28 all in series between the terminals 21 and 23 and having a total resistance substantially equal to the resistor R4 for balanced voltage output at the terminal 23 under normal operating conditions.

The other branch of the bridge circuit is indicated at 29 and includes the two bridge arms 30 and 31 connected serially between the terminals 21 and 26 and having a mid-terminal 32 at their junction. A single resistor element R1 is located in the branch 30 and a resistor R2 plus a diode D1 are located serially in the arm 30, with the diode D1 poled toward and connected with the negative terminal 26 of the bridge circuit. It will be noted that the resistors R1 and R2 are both of the same resistance as the resistor R4 in the bridge arm 25 of the opposite branch 24. Thus upon the application of DC operating potential to the input terminals 21 and 26, current will flow equally in both branches of the circuit and equally to each of the arms to provide the same potential drop therethrough. Current through the bridge arm 19 will thus flow through the lamp 28 and causing it to light. The potential drop at the terminal 23 will then be the same as the potential drop at terminal 32. A second indicator lamp 34 connected across the terminals 23 and 32 through circuit leads 35 will receive no operating current and therefore will not light under these conditions. This second lamp is a red or "no-go" signal for the apparatus to indicate an operating condition of a test circuit that is not normal, as will hereinafter be described. One of the bridge output terminals 23 may be connected to chassis ground for the apparatus as indicated at 36.

The input terminals 21 and 26 of the bridge circuit are connected with a suitable source of direct current supply such as the terminals 43 and 44 of a DC generator indicated at 38, through a reversing switch 39 and supply leads 40 and 41. With the reversing switch 39 set in the normal position indicated in the drawing, the positive and negative terminals 43 and 44 are connected with the positive and negative bridge input terminals 21 and 26 respectively. When the switch 39 is moved to the test position and in the opposite direction, the connections from the generator to the terminals 21 and 26 are reversed in polarity to perform one of the tests as will be described, after which the switch 39 is moved back to the normal position shown and as referred to. A third indicator lamp 42 may be connected between the terminals 21 and 26 to indicate the presence of operating current on the bridge terminals and thus serve as a warning if it should fail at any time. The lamp may be clear or white or any other color not used for the other indicating lamps in the equipment.

The polarity of the input terminals 21 and 26 are normally as indicated in FIG. 1, but may be reversed by operation of the switch 39 from the position N to the position T, indicating normal and test positions. The use of the reverse polarity will be described further in connection with the circuit shown in FIG. 3.

As viewed in FIG. 1 the positive input terminal 21 is connected through two bridge circuit branches 24 and 29 to the negative terminal 26. The branch 24 comprises the bridge arms 19 and 25. The latter includes a simple resistor R4. The arm 19 includes a diode rectifier D2 or the like, connected with the positive terminal 21 and thence to a test terminal 22, and between this terminal and the mid-terminal 23 of the branch, which is one output terminal of the bridge, is connected a control resistor R3 and the indicator lamp 28 in series relation as indicated.

In the second branch 29 of the bridge is provided the bridge arm 30 and the bridge arm 31 in series relation with a mid-terminal or output terminal 32 connected therebetween. The first arm of the bridge adjacent to the positive terminal 21 includes the single resistor arm 25 of R1 and directly opposite to the single resistor arm 25 of the bridge in the opposite branch 24. The branch 31 directly opposite to the branch 19 of the first bridge branch includes a series resistor R2 and a diode rectifier D1 in series therewith the latter being connected directly to the terminal 26 in the present example, although it may be on either side of the resistor R2. In this branch circuit it acts as a cut-off to prevent reverse current flow from the terminal 26 through the branch in the opposite direction toward the mid-terminal 32. The diode D1 is thus poled for normal conduction in the direction of the negative terminal 26.

Likewise in the directly opposite arm of the bridge in the first branch, that is the arm 19, the diode rectifier D2 is poled in the forward direction toward the positive terminal 21 and therefore opposes any current flow from the positive terminal 21 through the arm 19 in the opposite direction, which in this case is the normal direction from positive to negative, that is from the terminal 21 to the terminal 26.

Therefore, with this circuit arrangement of the arm 19, the terminals 21 and 22 become output terminals for the connection of the test leads 11 and 12 to apparatus for determining the operating condition of circuits that are normally closed, that is which in the normal operating condition cause the rectifier device D2 to be short circuited and therefore to permit normal current flow through the branch 24 from the positive terminal 21 to the negative terminal 26. In the present example the test leads 11 and 12 are connected to the circuit in the apparatus 14 to be tested to determine the continuity of the circuit 15 containing the switch S2, normally closed. Thus current may flow from the positive terminal 21 through the test lead 11 and the circuit 15, back to the test lead 12 and the terminal 22 and thus flow around the oppositely poled rectifier D2. Should the circuit 15 open or be partly opened then the rectified D2 would come into operation and prevent the flow of current from the positive terminal 21 through to the negative terminal 26 in that branch and in that arm and thereby upset the bridge balance.

Thus if the circuit 15 is closed, as it should be normally, then current will flow from the positive terminal 21 through the circuit 15 to the terminal 22 and thence through the control resistor R3 and the lamp 28 to the terminal 26. Current also flows from the positive terminal 21 through the branch 29, that is, the resistors R1 and R2 and the diode D1 to the negative terminal 26. The resistance of the lamp 28 plus the resistance of the resistor R3 is equal to the resistance of the other branches and therefore the bridge operates in a balanced condition to provide zero voltage output at the output terminals 23 and 32 and thereby causing the lamp 34 to be out or off, while the lamp 28 is on. The latter being green indicates a normal operating condition for the apparatus 14 and the circuit 15 therein being tested.

The terminals 21 and 23 also serve as output terminals for the bridge test circuits provided by the leads 11 and 13 as a pair for connection with the apparatus 14 and any circuits therein which are normally open as indicated by the legend "NO" between these test leads. In the apparatus 14, one such test circuit is represented by the circuit 16 in which is provided the normally-open switch S1 representing an open circuit condition in the circuit for whatever reason, either by switches or by other apparatus such as relays. The circuitry in the apparatus 14 as shown is merely typical and symbolic of the usual circuit means providing closed and open circuits which might include a multitude of different elements all providing closable and openable contacts as with switches S1 and S2 respectively.

Should the circuit 16 be closed accidentally, or for any reason, then the terminal 21 would effectively be short circuited to the terminal 23 and ground for the system and thereby short-circuiting the entire arm 19 with the diode resistor and indicator lamp 28. The green indicator would therefore be inoperative. Due to the change in resistance in the branch 19 from that of the resistor and lamp, or in this case substantially 226 ohms, the bridge balance is upset and brings the terminal 23 to the higher positive voltage level of the terminal 21, and thereby placing the lamp 34 substantially directly in parallel with the bridge arm 30 between the terminals 21 and 32. It therefore receives current flow from terminal 21 through the circuit 35 and thence to the terminal 32 and from the terminal 32 through the arm 31 and the diode D1, which is poled in the proper direction for current flow, to the terminal 26. The red lamp 34 therefore glows and indicates an abnormal circuit condition.

Should the switch S2, representing the normally-closed circuits of the apparatus 14, be opened, then current again would not flow in the branch 19, not by reason of short-circuit as before but by reason of open circuit due to the presence of the rectifier or diode D2 and its polarity direction. Here again the balance of the bridge circuit is upset and the terminal 23 is now energized at a lower potential than before from the negative terminal 26, thereby causing a current flow thereto from the terminal 21 through the terminal 32 and through the lamp 34 back to the terminal 23. The return circuit to the terminal 26 is completed through the arm 25 and the resistor R4.

The different circuit conditions above referred to are further depicted in the circuit diagrams of FIGS. 2, 4 and 5 as will be seen from a comparison of these figures with the basic figure 1.

With this improved bridge test circuit, a simple polarity change of the input terminals also provides a continuity test for the indicator lamps in the circuit itself, that is, the lamps 28 and 34 in the present example. The specific circuit established by the reverse operation of the switch 39 from the position N to the position T is shown more clearly in FIG. 3, to which attention is now directed along with FIG. 1. In this circuit the bridge branch 29 is upset in balance by the lack of current flow through the arm 31 due to the polarity relation of the diode rectifier D1 to the terminals 21 and 26. With the terminal 26 positive and the terminal 21 negative, reverse current flow is prevented by the diode, thereby effectively opening the arm 31 and causing a change in the bridge balance. Current flows from the now positive terminal 26 through the resistor R4 in the arm 25 and through the lamp 28, the resistor R3 and the switch 32 in the arm 19 of the branch 24 and thence to the terminal 21 which is now negative.

The terminal 23 is at a higher positive potential because of its closer connection to the terminal 26 through the arm 25, and the terminal 32 is similarly connected through the arm 30 with the now negative terminal 21. Therefore current flows from the now positive terminal 26 through the resistor R4 and the lamp 34 to the mid-terminal 32 and thence through the resistor R1 in the arm 30 to the now negative terminal 21. Thus both lamps 28 and 34 glow if they are in proper operating condition. The lack of operating potential on the terminals 21 and 26 is indicated at all times by the pilot lamp 42. Thus with the present bridge circuit, a plurality of effective tests and checks are provided through simple switching means and circuit connections involving substantially one arm of the bridge circuit and a properly polarized diode in the directly opposite branch of the circuit.

Thus it will be seen that in the single arm 19 of the bridge circuit there are provided the diode rectifier D2 poled in the direction of the normally positive terminal 21 and followed in circuit by a series resistor R3 and an indicator lamp 28 for indicating proper operating conditions. Between that terminal 23 and the opposite mid-terminal 32, a circuit indicating lamp 34 is connected which will indicate by its activation an abnormal operating condition of the apparatus under test.

The function of the diode D3 is to provide for operation of the green lamp 28 for the test of FIG. 3, in the event the switch S1 (normally open) is closed. This diode, poled as shown, prevents the improperly-closed S1 from shorting out the green lamp 28, R3 and D2 leg of the bridge during lamp test. The diode D2 is needed however, in the event that the normally-closed switch would be open. It then provides the only closed path from the terminal 22 to the terminal 21 for the green lamp test operation.

In this test arm 19 of the bridge circuit, the terminal 22 is provided between the diode D2 and the remaining elements, that is, the resistor R3 and indicator lamp 28, and serves, along with the terminal 21, as a test terminal for connection to external circuits through suitable test lead extensions 11 and 12. A second test connection is provided at the opposite end of the test arm 19 by the terminal 23 which may be extended through a test lead 13 to the apparatus under test. This lead is to test for open circuit, that is, normally open circuit conditions in the apparatus, while the first lead 12 is used for checking closed circuit conditions, that is, normally closed circuit conditions in the apparatus under test. The input terminal or positive input terminal 21 is a common terminal for both of these test leads 12 and 13 and may be extended as at 11 with either of the first test leads. As in the present example, it is preferably then connected to a common circuit element of the apparatus under test, as at 14 for example, and which is in both the open and closed circuits. This may be the chassis or ground circuit of the apparatus being tested. A simple diode rectifier as at D1, connected into the opposite arm 31 of the bridge network and poled for current conduction through the arm and branch in the normal direction from the positive input terminal to the negative input terminal, completes the circuit changes in the normal balanced resistance bridge network.

From the foregoing description it will be seen that a "go-no-go" bridge circuit for rapidly testing open and closed circuit conditions in electrical and electronic apparatus is provided wherein, under normal conditions, the polarity of the energy supply source or input terminals is such that there is current flow through the entire bridge and it is balanced. In connection with one arm of the bridge network, a normally-open test circuit and a normally-closed test circuit is provided for apparatus under test and is set and adjusted so that the bridge will be balanced and no current will flow through an abnormal indicator lamp, while a second lamp, for indicating normal operating conditions, will be activated.

If the polarity of the supply terminals is reversed, the diodes in the bridge arm prevent current flow through a portion of the bridge, which causes unbalance and an operating potential across both of the indicator lamps. Both lamps are thus lighted to indicate that they are working properly. A lamp failure could give an erroneous impression of the test circuit setting or adjustment. This particular circuit permits the lamps to be checked periodically in order to eliminate the possibility of error due to lamp failure.

If the circuits under test are improperly set, that is, the normally-open circuits are closed or the normally-closed circuits are open, the normal indicator lamp will be de-energized and the abnormal indicator lamp will be energized to indicate the fact.

The feature of reversing the polarity to the bridge and thereby energizing indicator lamps for testing of the lamp filaments is a desirable feature of this circuit. With this improved bridge circuit, resistance or circuit conditions can be determined in a conventional manner but also by reversing the polarity through the bridge the indicator lamps are properly tested for continuity. This same test would apply to any type of indicator device which requires current to be flowing therethrough for its effective operation.

I claim:

1. A test bridge-circuit for checking electrical apparatus for normal and abnormal open and closed circuit conditions, comprising in combination, an electrical bridge circuit having a positive input supply terminal and a negative input supply terminal and two resistance branches connected therebetween in parallel relation, each branch comprising two series resistance arms with an intermediate output terminal connected therebetween, a diode rectifier in one arm of a first of said bridge-circuit branches and connected with the positive input terminal directly and poled for conduction in opposition thereto, a resistor element and an indicator lamp connected serially between said diode and the intermediate output terminal of said branch, means for making external test circuit connections for normally open circuit conditions in said apparatus connected between said intermediate terminal and the positive supply terminal of the bridge circuit in parallel relation to said one arm, means connected in parallel relation with said diode rectifier for making external test circuit connections for normally closed circuit conditions in said apparatus, a second diode rectifier connected serially in one arm of a second of said bridge-circuit branches and poled for current conduction through said branch and arm in a normal direction from the positive to the negative input terminals, a second indicator lamp connected between the said intermediate output terminal and a corresponding intermediate output terminal in the second of said bridge-circuit branches to indicate with said first-named lamp respectively normal and abnormal circuit conditions in said apparatus under test, and means for reversing the polarity of the input terminals to said bridge circuit to apply operating current to said indicator lamps through said bridge circuit in polarity-opposition to said rectifiers, thereby to check the operating condition of said lamps.

2. A test bridge circuit as defined in claim 1, wherein a third indicator lamp is provided in connection with the input terminals of the bridge circuit for indicating the presence of operating voltage thereon and to prevent loss of said voltage without visual warning, and wherein said first and second indicator lamps provide different colored illumination upon activation to further differentiate and visually indicate said circuit conditions in said apparatus under test.

3. A test bridge circuit for checking electrical apparatus for normal and abnormal open-circuit and closed circuit conditions, comprising in combination, an electrical bridge circuit having opposite positive and negative input supply terminals and four balanced resistance arms connected between said input terminals in two parallel branch circuits with an intermediate bridge output terminal connected therebetween in each branch and effectively at opposite diagonals with respect to the positive and negative input terminals, a diode element connected in an arm of one of said branch circuits adjacent to and directly with the positive input supply terminal and poled in a direction to prevent current flow from said terminal in said arm and branch, a current-responsive visual indicator device connected serially in said arm between said diode element and the intermediate bridge output terminal of the branch, means providing open-circuit and closed-circuit test connections respectively with said intermediate output terminal and with said resistance arm between the resistance portion therein and said diode element, said test connections having a common test circuit return connection with the positive terminal of said bridge circuit, a second current-responsive visual indicator device connected between the diagonally-opposite output terminals of the bridge circuit, a diode element connected serially in the opposite arm of said bridge circuit in the other of said branch circuits and poled in a direction toward the negative input supply terminal to permit current flow through said arm and branch in the direction of the negative input terminal of the bridge circuit, means providing direct-current supply connections with the positive and negative input terminals of the bridge circuit, and test switch means for reversing said supply connections with the bridge input terminals to apply operating current to check both of said indicator devices prior to operation in said bridge circuit for testing said apparatus.

4. A test-bridge circuit as defined in claim 3, wherein the test circuit connection with said intermediate output terminal includes a third diode element poled for conduction in the direction of said terminal, and wherein a third visual indicator device is connected between the input terminals of the bridge circuit to prevent loss of supply voltage without visual warning.

References Cited

UNITED STATES PATENTS

| 2,456,499 | 12/1948 | Fritzinger | 324—54 X |
| 2,635,135 | 4/1953 | Lamont | 324—52 X |
| 2,799,013 | 7/1957 | Langer | 324—54 X |
| 2,827,624 | 3/1958 | Klein | 340—233 |

FOREIGN PATENTS 866,168  4/1961  Great Britain.

RUDOLPH V. ROLINEC, *Primary Examiner.*

WALTER L. CARLSON, *Examiner.*

G. R. STRECKER, *Assistant Examiner.*